United States Patent [19]

Roe

[11] 4,426,409

[45] Jan. 17, 1984

[54] CATIONIC POLYMERS FOR USE IN FREEZE PROTECTION OF COALS AND MINERALS

[75] Inventor: William J. Roe, Aurora, Ill.

[73] Assignee: Nalco Chemical Company, Oak Brook, Ill.

[21] Appl. No.: 394,969

[22] Filed: Jul. 2, 1982

[51] Int. Cl.$^3$ .............................................. B05D 7/00
[52] U.S. Cl. ......................................... 427/221; 44/6; 106/13; 252/70
[58] Field of Search ................ 427/221; 252/70; 44/6; 106/13

[56] References Cited

U.S. PATENT DOCUMENTS

| | | | |
|---|---|---|---|
| 4,254,166 | 3/1981 | Glarville et al. | 427/220 |
| 4,264,333 | 4/1981 | Shaw et al. | 44/6 |
| 4,287,236 | 9/1981 | Kestner et al. | 427/221 |

*Primary Examiner*—Norman Morgenstern
*Assistant Examiner*—Janyce A. Bell
*Attorney, Agent, or Firm*—John G. Premo; Robert A. Miller; Donald G. Epple

[57] ABSTRACT

A method for treating fine particles such as minerals and coal particles having surface moisture to reduce the cohesive strength of such particulate particles when frozen which comprises spraying the particles prior to freezing with an effective amount of a dilute aqueous solution of a water-soluble cationic polymer, which solution also contains a freezing point depressant amount of an anti-freeze chemical.

In a preferred embodiment of the invention, there is also included in the aqueous solution of the freezing point depressant polymer solution from ½ to about 5% by weight of gelatin or hydrolyzed gelatin.

8 Claims, No Drawings

CATIONIC POLYMERS FOR USE IN FREEZE PROTECTION OF COALS AND MINERALS

INTRODUCTION

When the surface moisture on particulate solids freezes, the ice acts as a powerful adhesive holding the particles together in a mass. The adhesivity is influenced by both the particle size of the solids and the moisture content. For example, coal with as little as 4 percent moisture will, when frozen, cohere so strongly as to require special handling to break up the frozen mass. It thus becomes difficult to unload or dump railway cars, trucks and other conveyances used to transport coal, mineral ores and other finely divided solids. It also makes difficult the movement of coal out of outdoor coal storage piles in a condition for fuel or other use. Unloading frozen coal from railroad cars is time consuming, can result in blocked dump chutes, and can often leave as much as 30 to 60 tons of coal in the car. Various techniques such as vibration, steam lances, fires under the cars, infrared heating in warming sheds and even dynamiting have been tried to unload frozen cars. The safety problems inherent in some of these techniques are obvious. Others are ineffective or totally impractical from an economic standpoint, particularly where conditions are so severe as to cause entire carloads of coal to freeze solid (as distinguished from merely perimeter freezing). All of these factors point to the definite need of developing an economic method of treating coal, ores, and other divided solids to overcome the problems of transport of those solids.

Various approaches have been used with limited degrees of success. Sodium chloride and calcium chloride salts have been added to moist coal as it is being loaded with some degree of success toward reducing the freezing problem. However, such salts contribute to the corrosion of all equipment with which the solids come in contact. Oil has been used to freeze-proof coal with questionable effectiveness. Oil soluble surfactants have been added to the oil and seem to improve the results. Ethylene glycol has been employed, but although successful, the cost of treatment has been very high.

THE PRIOR ART

Parks, U.S. Pat. No. 4,117,214. The teachings of this patent are summarized in the Abstract, a portion of which is presented below:

"The strength of ice is reduced by dissolving in water prior to freezing a composition of (A) a water-soluble polyhydroxy compound of monoalkylether thereof and (B) a water-soluble organic nonvolatile compound having a hydrophilic group such as amine, carboxyl or carboxylate groups in an amount to provide an effective amount, e.g., on the order of about 0.25–5 weight percent, of (A) plus (B) based on the weight of water."

Schloch, U.S. Pat. No. 3,298,804 is directed to the prevention of freezing together of coal particles. That is accomplished with a composition of hydrocarbon and a given class of surface-active compounds.

Kleinicke et al., U.S. Pat. No. 2,116,682 teaches treating coal with water containing a gel forming colloid and various inorganic salts. At page 3, right column, lines 5–23, the patent teaches some ice may form at low temperatures, but teaches away from suggesting the ice is modified by suggesting the solute becomes more concentrated in the remaining solution which is unfrozen.

Kleinicke, U.S. Pat. No. 2,436,146, teaches addition of a protective agent such as polyhydric alcohol to such a composition to prevent the salt from degrading the colloid.

Mori, U.S. Pat. No. 2,222,370, teaches a dust settling composition for coal mines which is an emulsion which may contain small quantities of ethylene glycol and oleic acid to give the emulsion greater permanence or stability, but no mention is made of cold weather applications.

Macaluso et al., U.S. Pat. No. 3,794,472, treat coal with an emulsion to prevent freezing of the coal.

Other art relating principally to deicing compositions or freeze depressants, particularly those suited for aircraft deicing applications, was cited in the parent application, including: Korman, U.S. Pat. No. 2,101,472, which teaches a gel containing gelatine to which is added as an antifreeze substance, glycerol and/or a glycol; West et al., U.S. Pat. No. 2,373,727, which teaches a composition such as in Korman, but also including a hydrocarbon to provide an emulsion; Fain et al., U.S. Pat. No. 2,716,068, which teaches a composition of a glycol, at least one of potassium thiocyanate, potassium acetate, urea, or certain inorganic salts, and optionally sodium nitrite; and Dawtrey et al., U.S. Pat. No. 3,350,314, which teaches a foamable composition of water, an alkylene polyol, and a long chain aliphatic tertiary amine.

Ordelt et al., U.S. Pat. No. 3,362,910, teaches an automotive antifreeze composition.

Scott, Jr., et al., U.S. Pat. Nos. 3,624,243 and 3,630,913, each relate to chemical deicers containing corrosion inhibitors making them specially suited for use on airport runways.

Shapiro, U.S. Pat. No. 2,454,886, relates to the prevention of mist and frost on glass and similar sheet material.

Kugel, U.S. Pat. No. 4,225,317, deals with a hydrocarbon liquid containing a nonionic surfactant having an HLB between 9.5 and 11.0.

In some work done in 1966, it was shown that certain cationic surfactants reduced ice crystal growth rates along a certain orientational axis, while gelatin produced a similar retardation along a different axis. However, the researchers observed no obvious change in crystal habit.

THE INVENTION

In accordance with the invention, it has been found that the structural cohesive strength of a frozen mass of moist coal, mineral, or other solid particulate can be substantially reduced by treating such particles, particularly coal particles, prior to freezing with an effective amount of a dilute aqueous solution of a water-soluble cationic polymer, which solution also contains a freezing point depressant amount of an antifreeze chemical. In a preferred embodiment of the invention, the freezing point depressant used to treat the aqueous solution of the cationic polymer is selected from either an alkaline earth metal salt cable of depressing the freezing point of water or a polyhydric alcohol. In most preferred embodiments of the invention, the compositions used to treat the coal particles also contain between ½–5% by weight of either gelatin or hydrolyzed gelatin.

Therefore, the invention is a composition for treating particulate particles having surface moisture to prevent the freezing together of such particles, which composition comprises a dilute aqueous solution of water-soluble cationic polymer, which solution also contains a freezing point depressant amount of an anti-freeze chemical. The invention contemplates a method for treating particulate particles having surface moisture to reduce the cohesive strength of such particulate particles when frozen, which comprises spraying the particulate particles prior to freezing with an effective amount of a dilute aqueous solution of a water-soluble cationic polymer, which solution also contains a freezing point depressant amount of an anti-freeze chemical.

The Water-Soluble Cationic Polymers

These materials may be selected from a wide variety of water-soluble cationic polymers. The polymers may be either addition polymers or condensation polymers. A most preferred polymeric material is polydiallyldimethylammonium chloride, hereafter referred to as poly-DADMAC. Polymers of this type are described in Butler, U.S. Pat. No. 3,288,770, the disclosure of which is incorporated herein by reference.

When polymers of this type are used, their molecular weight should be within the range of about 10,000 up to about 1,000,000. A preferred molecular weight range is between about 1,000–800,000. A most preferred molecular weight range is between 100,000–200,000.

Another preferred group of cationic polymers are the quaternary ammonium salts formed by reacting epichlorohydrin dimethylamine and a small amount of an ammonia or a polyamine. Polymers of this type are described and disclosed in Panzer, U.S. Pat. No. Re. 28,807 and U.S. Pat. No. Re. 28,808.

Another type of polymer useful in the practice of the invention are those polymers formed by reacting ethylene dichloride and ammonia to form a long chain polyalkylene polyamine, which material is then subsequently quaternized with an alkyl halide such as methyl chloride. Polymers of this type are described in Phillips, U.S. Pat. No. 3,372,129.

In addition to using these polymers, other cationic polymers that may be used are described in detail in Cox, Canadian Pat. No. 731,212.

The above polymers are frequently supplied commercially as relatively concentrated solutions, e.g. containing more than 20% by weight of polymer. They are usually thick, viscous solutions that, while amenable to pumping, are too concentrated for most applications of the present invention.

It is contemplated that the present invention would utilize these polymers in the form of dilute, aqueous solutions thereof. These solutions would contain between as little as 1–10% and, preferably, 2–6% by weight of the active polymer.

The Freezing Point Depressants

These materials are added to the polymer solutions described above to prevent them from freezing under conditions of outside storage in cold weather. The amount of freezing point depressant that may be used may vary depending upon the particular chemical employed, but as a general rule, it will be an amount sufficient to depress the freezing point of the polymeric solution to about −10° F. or below. The freezing-point depressants can be divided into several categories.

The Polyhydric Alcohols

Useful freezing point depressants are the well known polyhydric alcohols such as ethylene glycol, propylene glycol, butylene glycol, and glycerol. A preferred material is ethylene glycol. When used as the sole freezing point depressant, about 35% by weight of the total polymer solution should be used. This gives a freezing point of less than −10° F. to the polymer solutions.

The Salt Freezing Point Depressants

Useful materials of this type are magnesium or calcium chloride. Other salts such as sodium chloride, potassium chloride, and borax may be used but are less desirable. Potassium thiocyanate, potassium acetate, or sodium nitrite may also be used.

Miscellaneous Compounds

Other freezing point depressants such as urea may be used although due to their cost effectiveness as freezing point depressants, they are not preferred Of the above freezing point depressants, magnesium chloride is preferred. When used in amounts ranging between 16–17% by weight of the polymer solution, it is capable of depressing the freezing point of the solution to about −10° F.

It is obvious that the freezing point depressants can be used in larger amounts when the compositions used in the practice of the invention are used in very cold climates.

It is important to note that the freezing point depressants also act as active components in the formulation, further affecting the ice crystal habit in the frozen material mass.

The Gelatin or Hydrolyzed Protein

As will be shown hereafter, improved results are obtained when the polymer solutions contain gelatin or hydrolyzed protein in addition to the freezing point depressants. The amount used ranges from about ½ to about 5% by weight of the total formula although 2% by weight represents a preferred amount.

Miscellaneous Ingredients

While the above represents the basic teachings of my invention, it is understood that finished products may contain other ingredients not essential to the functioning of the invention but, yet, make the products more suitable from a commercial standpoint.

Illustrative of such components is the use of certain fatty compounds such as fatty amines or fatty acids or similar materials to prevent corrosion of metal surfaces in contact with the products used in the invention. These corrosion inhibitors are particularly beneficial when magnesium chloride is used as the freezing point depressant.

Another optional yet beneficial ingredient is the use of water-soluble surfactants to improve the wetting of coal surfaces to which the products are applied.

Another optional ingredient can be high molecular weight polymer which is water-soluble, e.g. polyacrylamide which is useful in preventing spray drift when the products are spray applied in the form of fine mists.

A final optional ingredient can be a low level of a fluorescent dye, which is very useful in field determinations of product dosage on mineral samples according to Kugel, U.S. Pat. No. 4,300,908.

Dosage

When used to prevent coal from freezing, the products are applied at a dosage ranging between ½ pint up to ½ gallon per ton of coal. They are particularly effective in reducing the cohesive strength of frozen coal particles which have a high water content.

Evaluation of the Invention

To evaluate the invention, the following test method was used:

Coal samples are passed through a ½" mesh screen, and testing is carried out on the −½" fraction. Larger coal samples are split into a number of 1000 gm sub-samples for treatment. These samples are placed into 1-gallon plastic jars and covered to prevent moisture loss. Liquid additives are sprayed on the samples using an air atomizing nebulizer while the coal is tumbling in the plastic jars. The tumbling is accomplished by rolling the jars on a laboratory scale jar roller. The treated coal is transferred to plastic cylinders (2⅝" ID×3¾" L) and shaken with a mechanical vibrator to ensure packing uniformity. Uniform packing may also be achieved by compressing the coal samples in the cylinders to a given packing pressure (∼3.5 psi) to simulate the packing at the bottom of a rail car. Both cylinder packing methods have been used successfully. The samples are then placed in the freezer for a given period of time. Typically, the samples are stored at −18° C. (−0° F.) overnight. After the freezing period, the coal samples are removed from the plastic cylinders and the unconfined compression strengths measured using a Soiltest Model U164 Compression Strength Tester. The more successful treatments result in lower compression strengths.

Compositions of the Invention and Prior Art Compositions

Composition 1
70.0000% Ethylene Glycol
29.8913% Water
0.1087% Dye

Composition 2
88.0913% #2 Fuel Oil
0.1087% Dye
11.8000% Surface Active Agents

Composition 3
57.1000% MgCl₂ Brine*
20.0000% Ethylene Glycol
22.6913% Water
0.1087% Dye
0.1000% Cationic Surfactant

Composition 4
90.0000% MgCl₂ Brine
6.0000% Ethylene Glycol
3.6913% Water
0.1087% Dye
0.2000% Cationic Surfactant

Composition 5
6.0000% PolyDADMAC
30.0000% Ethylene Glycol
61.6413% Water
0.1087% Dye
2.2500% Sodium Chloride

Composition 6
4.0000% PolyDADMAC
44.0000% MgCl₂ Brine
6.0000% Ethylene Glycol
0.2000% Cationic Surfactant
44.1913% Water
0.1087% Dye
1.5000% Sodium Chloride

Composition 7
44.0000% MgCl₂ Brine
6.0000% Ethylene Glycol
0.2000% Cationic Surfactant
49.6913% Water
0.1087% Dye

Composition 8
64.0000% MgCl₂ Brine
6.0000% Ethylene Glycol
0.2000% Cationic Surfactant
29.6913% Water
0.1087% Dye

Composition 9
4.0000% PolyDADMAC
50.0000% MgCl₂ Brine
0.2000% Cationic Surfactant
44.1913% Water
0.1087% Dye
1.5000% Sodium Chloride

Composition 10
3.4000% PolyDADMAC
3.0000% Gelatin
30.0000% Ethylene Glycol
62.2163% Water
0.1087% Dye
1.1275% Sodium Chloride

Composition 11
3.4000% PolyDADMAC

Composition 12
3.0000% PolyDADMAC
3.0000% Gelatin
50.0000% MgCl₂ Brine
00.2000% Cationic Surfactant
42.0163% Water
0.1087% Dye
1.2750% Sodium Chloride

Composition 13
67.0000% MgCl₂ Brine
3.0000% Gelatin
0.2000% Cationic Surfactant
26.6913% Water
0.1087% Dye

Composition 14
2.0000% Gelatin
53.0000% MgCl₂ Brine
0.2000% Cationic Surfactant
40.5663% Water
0.1087% Dye
1.1250% Sodium Chloride

Composition 14 (continued)
3.0000% PolyDADMAC
3.0000% Gelatin
52.0000% MgCl₂ Brine
0.1000% Cationic Surfactant
40.6663% Water
0.1087% Dye
1.1250% Sodium Chloride

Composition 15
7.2600% Mannich Quat
50.0000% MgCl₂ Brine
42.6313% Water
0.1087% Dye

Composition 16
6.0000% EDC/NH₃/Quat
50.0000% MgCl₂ Brine
43.8913% Water
0.1087% Dye

Composition 17
8.0000% EPC/DMA/Quat
50.0000% MgCl₂ Brine
41.8913% Water
0.1087% Dye

Composition 18
50.0000% MgCl₂ Brine
3.4000% PolyDADMAC
45.2663% Water
0.1000% Cationic Surfactant
0.1087% Dye
1.1250% Sodium Chloride

Composition 19
50.0000% MgCl₂ Brine
3.4000% PolyDADMAC
3.4000% Hydrolyzed Gelatin (60%)
41.8663% Water
0.1087% Dye Solution
0.1000% Cationic Surfactant
1.1250% Sodium Chloride

*All of the above formulations containing MgCl₂ were formulated with a magnesium chloride brine containing 32.0 weight percent magnesium chloride.

These compositions were tested with the results of these tests being set forth in Table I through V below.

TABLE I

Compression Test Results
Coal Sample 1

| Product Sample | Average Compression Strength (PSI) | % Reduction |
|---|---|---|
| Blank | 46.4 | — |
| Composition 3 | 24.8 | 46.6 |
| Composition 2 | 27.5 | 40.7 |
| Composition 4 | 33.8 | 27.2 |
| Composition 5 | 22.8 | 50.9 |

TABLE II

Compression Test Results
Coal Sample 2

| Product Sample | Average Compression Strength (PSI) | % Reduction |
|---|---|---|
| Blank | 83.2 | — |
| Composition 1 | 55.3 | 33.5 |
| Composition 2 | 59.2 | 28.8 |
| Composition 3 | 51.9 | 37.6 |
| Composition 8 | 47.3 | 43.1 |
| Composition 6 | 41.6 | 50.0 |
| Composition 7 | 61.4 | 26.2 |

TABLE III

Compression Test Results
Coal Sample 3

| Product Sample | Average Compression Strength (PSI) | % Reduction |
|---|---|---|
| Blank | 42.3 | — |

TABLE III-continued

| Product Sample | Compression Test Results Coal Sample 3 | |
|---|---|---|
| | Average Compression Strength (PSI) | % Reduction |
| Composition 4 | 33.8 | 20.1 |
| Composition 2 | 23.7 | 44.0 |
| Composition 10 | 23.7 | 44.0 |
| Composition 11 | 21.4 | 49.4 |
| Composition 12 | 27.2 | 35.7 |

TABLE IV

| Product Sample | Compression Test Results Coal Sample 4 | |
|---|---|---|
| | Average Compression Strength (PSI) | % Reduction |
| Blank | 29.4 | — |
| Composition 4 | 24.0 | 18.4 |
| Composition 9 | 24.0 | 18.4 |
| Composition 15 | 24.2 | 17.7 |
| Composition 16 | 23.8 | 19.0 |
| Composition 17 | 23.3 | 20.7 |
| Composition 11 | 18.3 | 37.7 |

TABLE V

| Product Sample | Compression Test Results Coal Sample 5 | |
|---|---|---|
| | Average Compression Strength (PSI) | % Reduction |
| Blank | 92.4 | — |
| Composition 4 | 77.3 | 16.4 |
| Composition 13 | 74.1 | 19.8 |
| Composition 14 | 59.3 | 35.8 |

These results clearly indicate that substitution of magnesium chloride solids with a cationic polymer yields a product at least as effective as straight MgCl$_2$ brine. The activity is further and substantially enhanced by the addition of 3% gelatin solids, as evidenced by the data in Tables III, IV, and V.

It allows the formulation of an active, low-cost freeze-conditioning agent that is quite different from anything described in the prior art.

I claim:

1. A method for treating particulate particles having surface moisture to reduce the cohesive strength of such particulate particles when frozen which comprises spraying the particulate particles prior to freezing with an effective amount of a dilute aqueous solution which contains about 1–10% by weight of a water-soluble cationic polymer, which solution also contains a freezing point depressant amount of an anti-freeze chemical.

2. A method for treating coal particles having surface moisture to reduce the cohesive strength of such coal particles when frozen which comprises spraying the coal particles prior to freezing with an effective amount of a dilute aqueous solution which contains about 1–10% by weight of a water-soluble cationic polymer, which solution also contains a freezing point depressant amount of an anti-freeze chemical.

3. The method of claim 1 wherein the freezing point anti-freeze chemical is from the group consisting of water-soluble polyhydric alcohols and water-soluble salts.

4. The method of claim 1 wherein the water-soluble cationic polymer is polyDADMAC.

5. The method of claim 2 where the anti-freeze chemical is magnesium chloride.

6. A method for treating coal particles having surface moisture to reduce the cohesive of such coal particles when frozen which comprises spraying the coal particles prior to freezing with an effective amount of a dilute aqueous solution which contains about 1–10% by weight of a water-soluble cationic polymer, which solution also contains a freezing point depressant amount of an anti-freeze chemical and from about ½–5% by weight of gelatin or hydrolyzed gelatin.

7. A composition for treating particulate particles having surface moisture to prevent freezing together of such particles which composition comprises a dilute aqueous solution which contains about 1–10% by weight of water soluble cationic polymer which solution also contains a freezing point depressant amount of an anti-freeze chemical.

8. The composition of claim 7 where the composition also contains from about ½–5% by weight of gelatin or hydrolized gelatin.

* * * * *

UNITED STATES PATENT AND TRADEMARK OFFICE
CERTIFICATE OF CORRECTION

PATENT NO. : 4,426,409
DATED : January 17, 1984
INVENTOR(S) : Willaim J. Roe

It is certified that error appears in the above—identified patent and that said Letters Patent are hereby corrected as shown below:

Column 8, Line 26, Claim 6 moisture to reduce the cohesive of such coal particles

"LETTERS PATENT SHOULD READ AS:"

moisture to reduce the cohesive strength of such coal particles

Signed and Sealed this

Twenty-seventh Day of March 1984

[SEAL]

Attest:

GERALD J. MOSSINGHOFF

Attesting Officer        Commissioner of Patents and Trademarks